(12) United States Patent
Maley et al.

(10) Patent No.: US 10,190,040 B2
(45) Date of Patent: Jan. 29, 2019

(54) SELF-SUSPENDING PROPPANT FOR HYDRAULIC FRACTURING

(71) Applicant: STEP ENERGY SERVICES LTD., Calgary (CA)

(72) Inventors: Darren Michael Maley, Calgary (CA); Mark Errol Abesamis Manipon, Calgary (CA)

(73) Assignee: STEP ENERGY SERVICES LTD., Calgary (CA)

( * ) Notice: Subject to any disclaimer, the term of this patent is extended or adjusted under 35 U.S.C. 154(b) by 0 days.

(21) Appl. No.: 15/470,445

(22) Filed: Mar. 27, 2017

(65) Prior Publication Data

US 2017/0283690 A1 Oct. 5, 2017

Related U.S. Application Data

(60) Provisional application No. 62/317,331, filed on Apr. 1, 2016.

(51) Int. Cl.
*C09K 8/80* (2006.01)
*C09K 8/62* (2006.01)
*E21B 43/267* (2006.01)
*C09K 8/66* (2006.01)

(52) U.S. Cl.
CPC .................. *C09K 8/80* (2013.01); *C09K 8/62* (2013.01); *C09K 8/66* (2013.01); *C09K 8/805* (2013.01); *E21B 43/267* (2013.01)

(58) Field of Classification Search
CPC .. C09K 8/80; C09K 8/62; C09K 8/805; E21B 43/26; E21B 43/267
See application file for complete search history.

(56) References Cited

U.S. PATENT DOCUMENTS

| | | | | |
|---|---|---|---|---|
| 6,109,350 A * | 8/2000 | Nguyen | ................... | C09K 8/14 166/281 |
| 9,297,244 B2 * | 3/2016 | Mahoney | ............... | E21B 43/267 |
| 9,315,721 B2 * | 4/2016 | Mahoney | ............... | C09K 8/805 |
| 9,644,139 B2 * | 5/2017 | Mahoney | ............... | C09K 8/805 |
| 2013/0233545 A1 * | 9/2013 | Mahoney | ................. | C09K 8/80 166/280.2 |
| 2014/0000891 A1 * | 1/2014 | Mahoney | ............... | C09K 8/805 166/280.2 |
| 2014/0014348 A1 * | 1/2014 | Mahoney | ............... | C09K 8/805 166/308.2 |
| 2014/0060832 A1 * | 3/2014 | Mahoney | ............... | E21B 43/267 166/280.2 |
| 2014/0228258 A1 * | 8/2014 | Mahoney | ............... | C09K 8/805 507/219 |
| 2016/0137913 A1 * | 5/2016 | Mahoney | ............... | C09K 8/805 166/280.2 |
| 2017/0058191 A1 * | 3/2017 | Mahoney | ................. | C09K 8/80 |

\* cited by examiner

*Primary Examiner* — Zakiya W Bates
*Assistant Examiner* — Crystal J Miller
(74) *Attorney, Agent, or Firm* — Bennett Jones LLP

(57) ABSTRACT

A proppant composition includes: a volume of water; a self-suspending proppant, including a plurality of proppant granules each with a hydrophilic polymer coating, the hydrophilic polymer coatings of the self-suspending proppant together defining a total polymer volume; and an untreated proppant, where a concentration of the self-suspending proppant in the water is sufficient (i) to reduce the water to an unabsorbed volume of less than 25% of the volume of water and (ii) to hydrate at least 75% of the total polymer volume.

4 Claims, 1 Drawing Sheet

SELF-SUSPENDING PROPPANT FOR HYDRAULIC FRACTURING

THE FIELD OF THE INVENTION

This invention relates to oil field and oil well development, and, more particularly, to novel systems and methods for fracturing and propping fissures in oil-bearing formations to increase productivity.

BACKGROUND

In oil and gas well operations, various methods have been developed for stimulating production of well bores associated with a reservoir. For example, wellbore fracturing technology has been suggested in order to increase permeability of reservoirs.

It has been suggested that well production can be improved by fracturing formations. Fracturing is typically done by pumping a formation full of a fracturing fluid and pressurizing that fluid in order to apply large surface forces to parts of the formation. These large surface forces cause stresses, and by virtue of the massive areas involved, can produce extremely high forces and stresses in the rock formations.

Accordingly, the rock formations tend to shatter, causing fractures in the reservoir rock, thereby increasing porosity and providing space for the produced fluids, such as oil and/or gas, to pass through the formation toward the bore hole for extraction.

Proppant is sometimes employed with the fracturing fluid to prop open the fractures when they form. Proppant is a granulated material each granule having a hard inner substrate such as of sand, resin, shell, ceramic, etc. The difficulty has been how to maintain the proppants suspended in the fluid in order to carry it downhole into the fracture.

Self-suspending proppant has been developed. Self-suspending proppant includes the hard proppant inner substrate coated with a water absorbing polymer coating. Such a proppant may be mixed with a liquid to form a fracturing fluid, and the coating reacts with the liquid to form fracturing fluid with a viscosity, resistance to settling and other features. A self-suspending proppant reduces the need for separately added viscosifiers. However, self-suspending proppant is more expensive than untreated proppant.

SUMMARY

A proppant composition and method are described.

In accordance with one aspect of the invention, a proppant composition includes:
 a volume of water;
 a self-suspending proppant, including a plurality of proppant granules each with a hydrophilic polymer coating, the hydrophilic polymer coatings of the self-suspending proppant together defining a total polymer volume; and
 an untreated proppant,
 where a concentration of the self-suspending proppant in the water is sufficient (i) to reduce the water to an unabsorbed volume of less than 25% of the volume of water and (ii) to hydrate at least 75% of the total polymer volume.

A proppant composition as described optimizes the amount of self-suspending proppant employed to reach a target proppant load in the proppant composition. This avoids wasteful overuse of self-suspending proppant. Such a proppant composition substantially prevents settling of the untreated proppant for at least 4 minutes and in some embodiments at least 10 minutes. In some embodiments, proppant can remain substantially suspended for considerable periods of time, such as for example, over an hour.

The composition includes enough self-suspending proppant such that at least 75% of the water is absorbed by the self-suspending proppant. When the water is absorbed by the self-suspending proppant, the polymer on the self-suspending proppant swells. Since the self-suspending proppant has absorbed most of the volume of the water, this composition delays and may substantially avoid settling of both treated and untreated proppant, since there is no water to settle through and the swollen polymer supports the proppant. Further addition of treated proppant to the water beyond a concentration where at least 75% of the total polymer volume is hydrated, has minimal benefit due to the lack of water remaining to hydrate the polymer.

In accordance with another aspect of the invention, there is provided a method for preparing a fracturing fluid comprises:
 adding an amount of a self-suspending proppant to a volume of water, the self-suspending proppant including a plurality of proppant granules each with a hydrophilic polymer coating, the hydrophilic polymer coatings of the self-suspending proppant together defining a total polymer volume and the amount of self-suspending proppant being sufficient to hydrate at least 75% of the total polymer volume and to reduce the water to a volume of free water of less than 25% by volume of the proppant composition; and
 adding an amount of untreated proppant.

In accordance with another broad aspect of the present invention, there is provided a method for fracturing a formation, the method comprising:
 pumping a fracturing fluid into a well bore, the fracturing fluid including:
  water;
  a self-suspending proppant, including a plurality of proppant granules each with a hydrophilic polymer coating, the hydrophilic polymer coatings of the self-suspending proppant together defining a total polymer volume; and
  an untreated proppant,
  where the concentration of the self-suspending proppant in the water is sufficient to hydrate at least 75% of the total polymer volume and to reduce the water to a free volume of less than 25% by volume of the proppant composition; and
 pressuring up the fracturing fluid to create fractures in a formation exposed in the well bore.

In some embodiments of the foregoing, the concentration of the self-suspending proppant in the water is selected: (i) to reduce the water to an unabsorbed volume of less than 20% or even 10% of the volume of water and (ii) to hydrate at least 80%, or even 90%, of the total polymer volume.

BRIEF DESCRIPTION OF THE FIGURES

The figures show results using the invention.

DETAILED DESCRIPTION OF EMBODIMENTS

Figure 1:
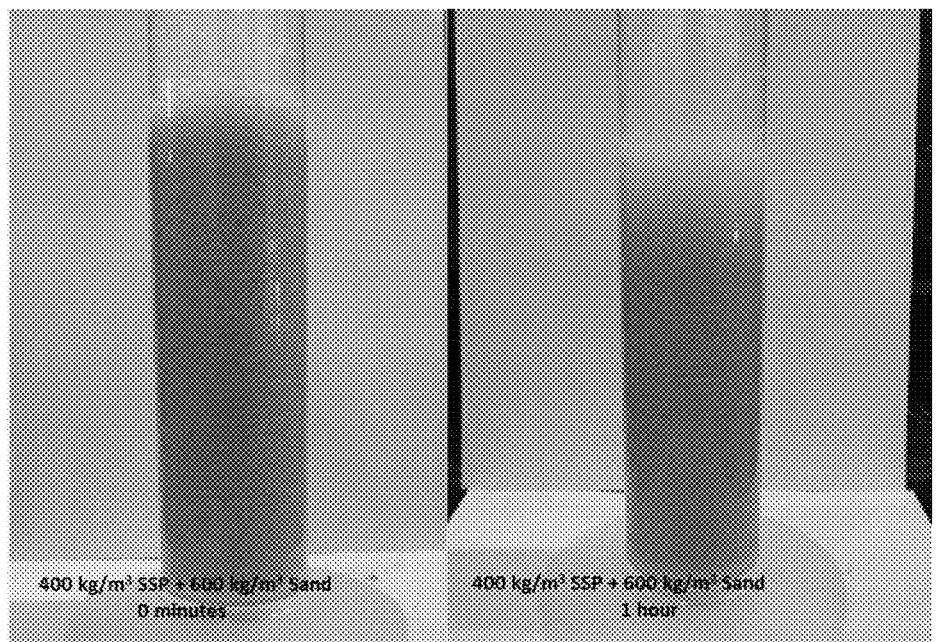
FIGS. 1 and 2 display the suspension results of two different proppant loadings.

In one embodiment, a proppant composition includes:
 a volume of water;

a self-suspending proppant, including a plurality of proppant granules each with a hydrophilic polymer coating, the hydrophilic polymer coatings of the self-suspending proppant together defining a total polymer volume; and an untreated proppant, where a concentration of the self-suspending proppant in the water is sufficient (i) to reduce the water to an unabsorbed volume of less than 25% of the volume of water and (ii) to hydrate at least 75% of the total polymer volume.

A proppant composition as described optimizes the amount of self-suspending proppant employed to reach a target proppant load in the proppant composition. This avoids wasteful overuse of self-suspending proppant. Such a proppant composition substantially prevents settling of the untreated proppant for at least 4 minutes and in some embodiments at least 10 minutes. In some embodiments, proppant can remain substantially suspended for considerable periods of time, such as for example, over an hour.

The composition includes enough self-suspending proppant such that at least 75% of the water is absorbed by the self-suspending proppant. When the water is absorbed by the self-suspending proppant, the polymer on the self-suspending proppant swells. Since the self-suspending proppant has absorbed most of the volume of the water, this composition delays and may substantially avoid settling of both treated and untreated proppant, since there is no water to settle through and the swollen polymer supports the proppant. Further addition of treated proppant to the water beyond a concentration where at least 75% of the total polymer volume is hydrated, has minimal benefit due to the lack of water remaining to hydrate the polymer.

In another embodiment, there is a method for preparing a fracturing fluid comprises:

adding an amount of a self-suspending proppant to a volume of water, the self-suspending proppant including a plurality of proppant granules each with a hydrophilic polymer coating, the hydrophilic polymer coatings of the self-suspending proppant together defining a total polymer volume and the amount of self-suspending proppant being sufficient to hydrate at least 75% of the total polymer volume and to reduce the water to a volume of free water of less than 25% by volume of the proppant composition; and adding an amount of untreated proppant.

In another embodiment, there is a method for fracturing a formation, the method comprising:

pumping a fracturing fluid into a well bore, the fracturing fluid including:

water;

a self-suspending proppant, including a plurality of proppant granules each with a hydrophilic polymer coating, the hydrophilic polymer coatings of the self-suspending proppant together defining a total polymer volume; and an untreated proppant, where the concentration of the self-suspending proppant in the water is sufficient to hydrate at least 75% of the total polymer volume and to reduce the water to a free volume of less than 25% by volume of the proppant composition; and pressuring up the fracturing fluid to create fractures in a formation exposed in the well bore.

In some embodiments of the foregoing composition and methods, the concentration of the self-suspending proppant in the water is selected: (i) to reduce the water to an unabsorbed volume of less than 20% or even 10% of the volume of water and (ii) to hydrate at least 80%, or even 90%, of the total polymer volume.

Proppant, both self-suspending and untreated, is a granulated material each granule having a hard inner substrate such as of sand, resin, shell, ceramic, etc. Sometimes proppant is simply referred to as sand.

Self-suspending proppant is a proppant where the hard inner substrate of each granule is coated with a water absorbing polymer coating, also describes as hydrogel, hydrophilic polymer or water swellable polymer. For example, the polymer coating may comprise a polymer selected from the group consisting of polyacrylamide, hydrolyzed polyacrylamide, copolymers of acrylamide with ethylenically unsaturated ionic comonomers, copolymers of acrylamide and acrylic acid salts, poly(acrylic acid) or salts thereof, carboxymethyl cellulose, hydroxyethyl cellulose, hydroxypropyl cellulose, guar gum, carboxymethyl guar, carboxymethyl hydroxypropyl guar gum, hydrophobically associating swellable emulsion polymers, and latex polymers.

In embodiments, the hydrogel coating comprises a hydrophobic comonomer selected from the group consisting of alkyl acrylate esters, N-alkyl acrylamides, N-isopropylacrylamide, propylene oxide, styrene, and vinylcaprolactam. In embodiments, the coating is capable of expanding in volume in contact with an aqueous fluid to form a swollen hydrogel coating having a thickness of at least about 10% greater than the dried coating. In embodiments, the hydrogel coating comprises a polymer selected from the group consisting of polyacrylamide, poly(acrylic acid), copolymers of acrylamide with acrylic acid salts, carboxymethyl cellulose, hydroxyethyl cellulose, hydroxypropyl cellulose, guar gum, carboxymethyl guar, carboxymethyl hydroxypropyl guar gum, hydrophobically associating swellable emulsion polymers, and latex polymers. In embodiments, the hydrogel coating further comprises chemical additives selected from the group consisting of scale inhibitors, biocides, breakers, wax control agents, asphaltene control agents, and tracers.

In embodiments, the modified proppant further comprises a cationic/anionic polymer pair comprising a cationic polymer and a high molecular weight anionic polymer; the cationic polymer can be selected from the group consisting of poly-DADMAC, LPEI, BPEI, chitosan, and cationic polyacrylamide. In embodiments, the modified proppant further comprises a crosslinking agent; the crosslinking agent can comprise a covalent crosslinker, and the covalent crosslinker can comprise a functional group selected from the group consisting of an epoxide, an anhydride, an aldehyde, a diisocyanate, and a carbodiamide. In embodiments, the covalent crosslinker can be selected from the group consisting of polyethylene glycol, diglycidyl ether, epichlorohydrin, maleic anhydride, formaldehyde, glyoxal, glutaraldehyde, toluene diisocyanate, and methylene diphenyl diisocyanate, 1-ethyl-3-(3-dimethylaminopropyl) carbodiamide. In embodiments, the modified proppant can further comprise a delayed hydration additive; the delayed hydration additive can be selected from the group consisting of a low hydrophilic-lipophilic balance surfactant, an exclusion agent capable of excluding a finishing surfactant, a light ionic crosslinking agent, a light covalent crosslinking agent and a monovalent salt charge shield. In embodiments, the modified proppant further comprises an alcohol selected from the group consisting of ethylene glycol, propylene glycol, glycerol, propanol, and ethanol. In embodiments, the modified proppant further comprises an anticaking agent.

Generally, the polymer coating, when hydrated with water, will expand to a thickness that is at least 10% greater than the dry coating thickness.

In this application, untreated proppant is any proppant in which the proppant granules are free of a swellable polymer coating. Herein, the term untreated is meant to be with respect to the absence of swellable polymer coatings, but the hard inner substrate may be treated with other coatings such as surfactants, siloxane surfactants, anti-stick and/or strengthening chemicals, colorants, silicone, resins, dust mitigating chemicals etc. In one embodiment, the untreated proppant may be unmodified sand and/or siloxane coated proppant. Untreated proppant may be referred to as untreated sand, uncoated proppant or uncoated sand.

In embodiments, the amount of hydrogel polymer coating can be in the range of about 0.1 to about 10% based on the weight of the proppant. In embodiments, the hydrogel layer applied onto the surface of the proppant substrate can be a coating thickness of about 0.01% to about 10% of the average diameter of the proppant substrate. Upon hydration and swelling of the hydrogel layer in the fracturing fluid, the hydrogel layer can become expanded with water, such that the hydrogel layer thickness can become about 10% to about 1000% of the average diameter of the proppant substrate.

A proppant composition is sometimes referred to as a fracturing fluid. The proppant composition includes the self-suspending proppant at a concentration in the base fracturing fluid water such that a swellable coating of the self-suspending proppant is substantially fully hydrated and substantially all of the water is used for hydration to minimize free water in the composition. That concentration of self-suspending proppant most efficiently uses the self-suspending proppant and substantially prevents settling of proppant, including the untreated proppant, for more than 4 minutes. In one embodiment, a concentration of self-suspending proppant is employed in the fracturing fluid that substantially prevents settling of proppant, including the untreated proppant, for at least 10 minutes The water can be fresh water or brine. The water may include other additives such as gelling agents, cross linkers, etc. The additives may also absorb some of the water, which reduces the amount of self-suspending proppant required.

In one embodiment, the proppant composition includes self-suspending proppant in water at a concentration of about 300 to 500 kg/m3, which is about 20% to 35% w/w sand. In one embodiment, 350 to 450 kg/m3 self-suspending proppant is employed. This proppant concentration varies by polymer type and total coating volume of the proppant, such as may be determined by coating thickness and the presence of the additives, such as other gelling agents in the water.

In order to a proppant loading target, the proppant composition also includes untreated proppant in any amount. For example, in some embodiments, the composition may include any amount up to about 1000 kg/m3 untreated proppant, but generally the concentration of untreated proppant will be about 100 to 800 kg/m3 for example about 600 kg/m3 to achieve a maximum target loading of 500 to 1500 kg/m3 total proppant (including both self-suspending and untreated). In most embodiments, the maximum target loading is 600 to 1000 kg/m3 total proppant (including both self-suspending and untreated)

Where the water includes other additives such as in a linear gel base that contains a gelling agent or a cross-linked gel, less self-suspending proppant may be needed to have substantially all water absorbed. With a linear base gel, for example, less self-suspending proppant is needed to absorb substantially all the free water. In one embodiment, the proppants can be added to a gelled water base such as a linear gel. For example, using a linear gel formed with guar gellant, less self-suspending proppant may be needed to obtain a composition where at least 75% of the water is absorbed and no more than 75% of the total volume of polymer remains unhydrated. In one embodiment of a linear gel, only 200 to 400 kg/m3 self-suspending proppant may be needed to have substantially all water absorbed.

EXAMPLES

Example I—Self-Suspending Proppant (SSP) and Untreated Proppant in Fresh Water—Tests to Identify Loading to Resist Settling of Proppant Granules (Sand)

Proppant suspension capability of each loading is tested qualitatively in order to determine the critical concentration of proppant required to achieve excellent sand suspension, while maintaining cost effectiveness by reaching a target proppant load with untreated proppant.

Varying concentrations of sand slurry were prepared in a blender and left to settle in order to evaluate its suspension capabilities. The self-suspending proppant is proppant called Propel SSP™, available from Fairmont Santrel. The untreated proppant is natural sand. Table 1 indicates the observations during the test. Acceptable carrying capacity was observed at 300 kg/m$^3$ SSP, which is the point at which all but about 25% of the water is absorbed into the polymer coating. The best results were identified at a loading of 400 kg/m$^3$ of SSP. At this concentration, almost all the water was absorbed and the coating was almost 100% hydrated. 400 kg/m$^3$ of SSP provided the greatest carrying capacity. A test that involves a total of 1000 kg/m$^3$ of proppant (400 kg/m$^3$ SSP and 600 kg/m$^3$ uncoated sand), provided excellent dispersion of coated and uncoated sand even after 1 hour settling test.

Concentrations above 400 kg/m$^3$ of SSP would have decreasing efficiency, since the more expensive coated proppant would increasingly, with increased concentration in water, remain unhydrated, as no water remains to hydrate it.

TABLE 1

The following data shows that 400 kg/m$^3$ of proppant yielded the best suspension of the sand pack in fresh water.

| SSP (kg/m$^3$) | Uncoated Sand (kg/m$^3$) | Observations |
|---|---|---|
| 100 | 0 | Settled fairly quickly, slight viscosity was observed. |
| 200 | 0 | Majority has settled after 1 minute. Fluid is viscous. |
| 200 | 100 | Settled after 50 seconds. Quick separation of uncoated sand. |
| 300 | 100 | Settling is evident after 1 minute. Almost entirely settled after 4 minutes. |
| 400 | 100 | Suspension is excellent after 10 minutes. Uncoated sand doesn't seem to be separating. |
| 400 | 600 | Suspension is excellent. Separation of uncoated sand is not evident. Settling is observed after 1 hour. |

Figure 2:
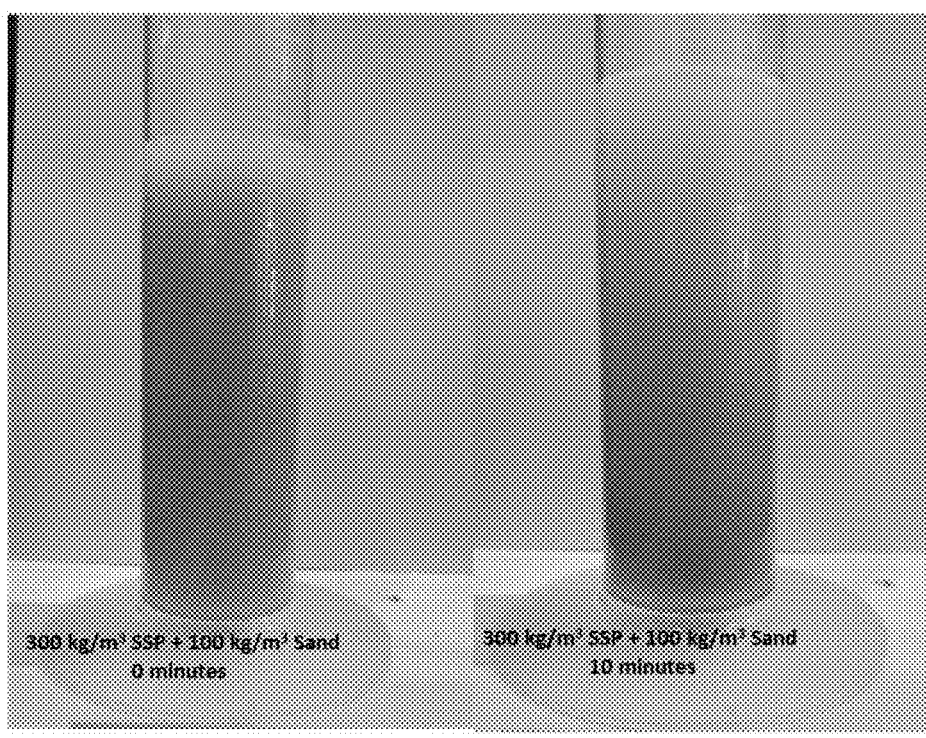

FIGS. 1 and 2 display the ability of two different proppant loadings to suspend the sand pack. In FIG. 1: 400 kg/m$^3$ of SSP was found to be the optimal loading for suspension in fresh water. After 1 hour of testing, 600 kg/m$^3$ of uncoated sand did not separate and remained suspended. In FIG. 2:

300 kg/m³ of SSP showed adequate sand suspension. The uncoated sand at 300 kg/m³ separated and settled after 10 minutes. In particular, the 400 kg/m³ loading was able to show excellent suspension after 1 hour, while the uncoated sand in the 300 kg/m³ SSP loading was still good, but settled after 10 minutes.

Concentrations above 400 kg/m³ would show excellent suspension, likely remaining suspended for at least 1 hour, but increasing concentrations would exhibit increasing amounts of unhydrated polymer coating. As such, concentrations above 400 kg/m³ increasingly become less desirable.

Example 2—Self-Suspending Proppant (SSP) and Untreated Proppant in Fresh Water—Follow Up Tests to Identify Loading to Resist Settling of Proppant Granules (Sand)

Tests were conducted to investigate a concentration of SSP between 300 and 400 kg/m³.

Using the same materials as in Example 1, a proppant composition of 350 kg/m³ SSP and 100 kg/m³ untreated proppant was prepared in a blender and left to settle in order to evaluate its suspension capabilities. This composition has a concentration of sand sufficient to hydrate about 80% of the SSP polymer coating.

No settling was observed for 15 minutes.

Example 3—Self-Suspending Proppant and Untreated Proppant in Linear Gel—Tests to Identify Loading to Resist Settling of Proppant Granules (sand)

A linear base gel of 3.0 kg/m³ guar slurry was prepared in order to determine if a lower loading of SSP is capable of suspending the sand pack. 200 kg/m³ of Propel SSP and 200 kg/m³ of natural sand were mixed with the linear gel. The mixture was observed to have a good sand suspension after 15 minutes, but settling then began to occur. This presents the possibility of using a lower concentration of SSP and a higher loading of uncoated sand in linear gels.

Example 3—Self-Suspending Proppant and Untreated Proppant—Tests with Siloxane Coated Sand as Untreated Sand Tests will show that this beneficial effect is also obtained with other types of untreated proppant. In fact, some untreated sands, such as siloxane-coated proppant, such as is available from Preferred Sands, may benefit in mixing with self-suspending proppant.

A suitable proppant concentration in fresh water was found to be about 400 kg/m³ of SSP, suspending uncoated sand up to 600 kg/m³ for over an hour. With a 3.0 kg/m³ linear gel, the SSP loading was lowered to 200 kg/m³, and was able to suspend proppant for 15 minutes before settling occurred.

A proppant composition maintains the concentration of self-suspending proppant in a range where the concentration of SSP is high enough that most water is absorbed to hydrate the polymer coating of the self-suspending proppant and the concentration does not exceed a point where an excessive amount of the polymer remains unhydrated. With the self-suspending proppant in that range, untreated proppant is added to bring the concentration of proppant up to the target proppant load (concentration).

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A proppant composition comprising:
   a volume of water;
   300-500 kg/m³ of a self-suspending proppant, including a plurality of proppant granules each with a hydrophilic polymer coating, the hydrophilic polymer coatings of the self-suspending proppant together defining a total polymer volume; and
   100-800 kg/m³ of an untreated proppant,
   wherein there is a total proppant load including both the self-suspending proppant and the untreated proppant of 500-1000 kg/m³ in the composition and wherein a concentration of the self-suspending proppant in the water is sufficient (i) to reduce the water to an unabsorbed volume of less than 25% of the volume of water and (ii) to hydrate at least 75% of the total polymer volume.

2. A method for preparing a fracturing fluid comprising:
   adding 300-500 kg/m³ of a self-suspending proppant to a volume of water, the self-suspending proppant including a plurality of proppant granules each with a hydrophilic polymer coating, the hydrophilic polymer coatings of the self-suspending proppant together defining a total polymer volume and the amount of self-suspending proppant being sufficient to hydrate at least 75% of the total polymer volume and to reduce the water to a volume of free water of less than 25% by volume of the proppant composition; and
   adding 100-800 kg/m³ of an untreated proppant to thereby prepare a fracturing fluid with a total proppant load of both the self-suspending proppant and the untreated proppant of 500-1000 kg/m³.

3. A method for fracturing a formation, the method comprising:
   pumping a fracturing fluid into a well bore, the fracturing fluid including:
      water;
      300-500 kg/m³ of a self-suspending proppant, including a plurality of proppant granules each with a hydrophilic polymer coating, the hydrophilic polymer coatings of the self-suspending proppant together defining a total polymer volume; and
      100-800 kg/m³ of an untreated proppant,
      wherein there is a total proppant load of both the self-suspending proppant and the untreated proppant of 500-1000 kg/m$^3$ in the composition and wherein the concentration of the self-suspending proppant in the water is sufficient to hydrate at least 75% of the total polymer volume and to reduce the water to a free volume of less than 25% by volume of the proppant composition; and pressuring up the fracturing fluid to create fractures in a formation exposed in the well bore.

4. The method of claim 3 wherein the concentration of the self-suspending proppant in the water is selected: (i) to reduce the water to an unabsorbed volume of less than 10% of the volume of water and (ii) to hydrate at least 90% of the total polymer volume.

* * * * *